UNITED STATES PATENT OFFICE.

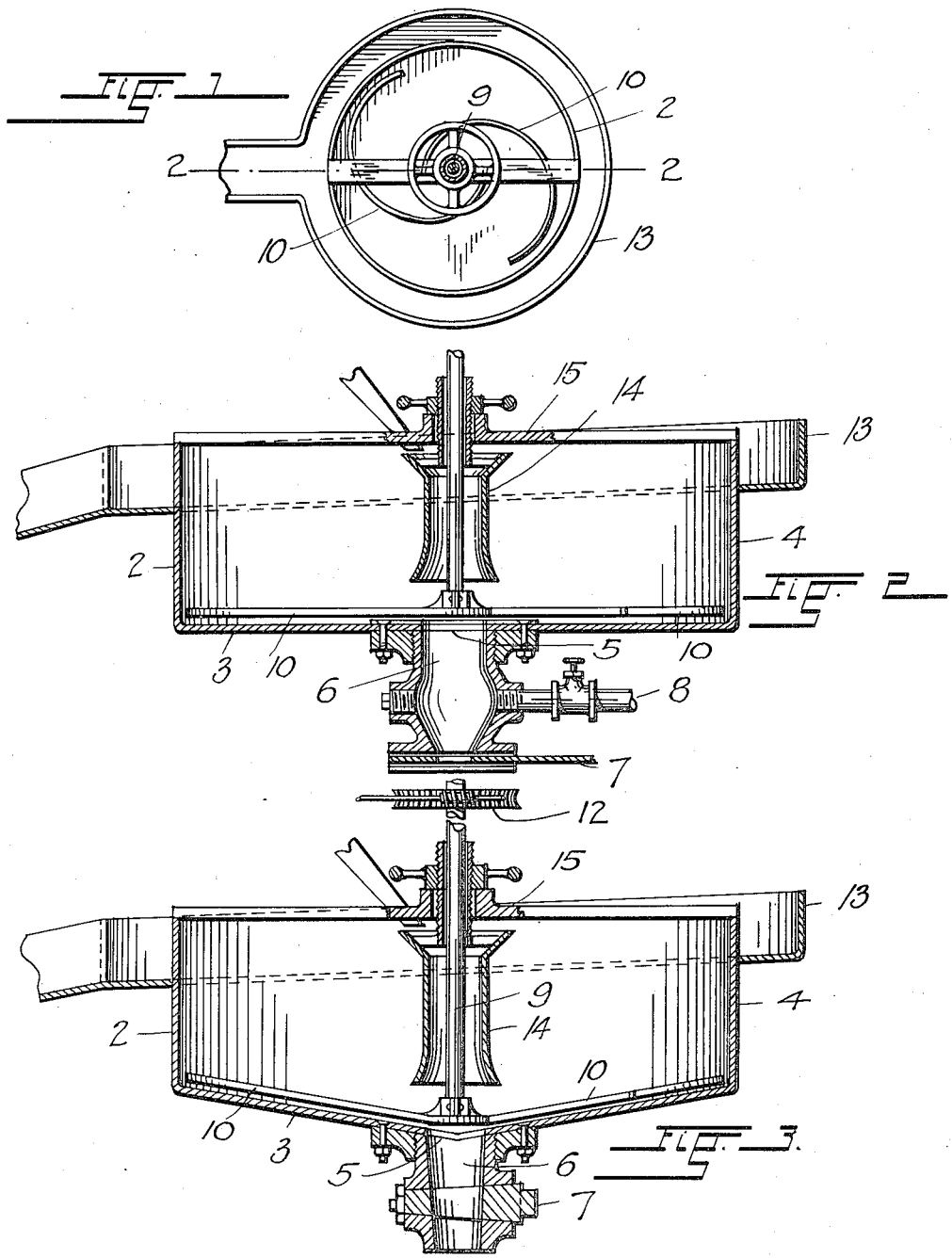

ALFRED L. BLOMFIELD, OF DENVER, COLORADO, ASSIGNOR TO THE DORR COMPANY, A CORPORATION OF DELAWARE.

CLASSIFIER.

1,260,135.

Specification of Letters Patent.

Patented Mar. 19, 1918.

Application filed April 21, 1916. Serial No. 92,772.

*To all whom it may concern:*

Be it known that I, ALFRED L. BLOOMFIELD, a subject of George V, King of England, residing at Denver, in the county of Denver and State of Colorado, have invented certain new and useful Improvements in Classifiers, of which the following is a specification.

My invention relates to classifiers and more particularly to apparatus of the type in which the larger particles of ore-pulp fed into a suitable container are by gravitation separated from the finer matter which in a suspended condition overflows at the top of the same.

In apparatus of this character as used at present, the separation of the different sizes of ore-particles comprised in pulp fed into the container, is effected by the differences in their specific gravities and is, if necessary, accelerated by the provision of an upflowing counter-current.

The container is made of downwardly tapering form for the purpose of compelling the settling oversize to move toward an outlet at its lower end, and the separative action is in consequence uncertain, variable and generally unreliable, it being an established fact that in a tapering container the settling velocities vary at different depths, and that the sloping sides provide a depository for part of the settling solids which in building upon the said sides, decrease the volume of the vessel.

The use of a tapering classifier is furthermore objectionable in that it requires a head space of considerable height, in that its operation is very susceptible to differences in the feed, in that in most milling plants, its height necessitates the use of elevators for the conveyance of its products, and in that special dewatering devices are required to deliver the coarse product at the degree of density which helps to adapt it for further treatment.

It is the primary object of the present invention to provide an apparatus of simple construction in which the above enumerated objectionable features of a tapering classifier are eliminated by the provision of mechanical means for impelling the settling matter continuously to the point of their discharge, by forming the container in which the separating action takes place so as to provide a settling zone of substantially uniform diameter, and by providing an adjustable conduit for feeding the material into the container below the level of liquid established by its overflow.

In the operation of a classifier of the improved construction as hereinabove outlined, a constant velocity of the material in the settling zone is assured, accumulation of the settling solids in the bottom portion of the container is prevented and inasmuch as no vessels of excessive height are required to effect the proper separation and constant discharge of the coarse product, but little head space is needed in the installation of the apparatus.

The above and other objects, all of which will fully appear in the course of the following description, I attain by the features of construction and arrangement of parts shown in the accompanying drawings in the various views of which like parts are similarly designated and in which, Figure 1 is a plan view of my improved classifier, Fig. 2, a section taken along the line 2—2, Fig. 1, and Fig. 3, a section similar to that in Fig. 2, showing a modified construction of my invention.

Referring more specifically to the drawings, the reference numeral 2 designates a vessel having in its preferred form, a substantially flat bottom 3 and a cylindrical upright wall 4.

The vessel is shallow in comparison with its diameter, inasmuch as by reason of the provision of an element for mechanically impelling the settling solids toward the discharge opening, an extensive settling zone is unnecessary.

An outlet 5 in the bottom of the vessel connects with a chamber 6 the flow through which is controlled and regulated by means of a valve 7.

The chamber has at a point between its valve seat and the outlet of the vessel, an inlet which by means of a valve-controlled conduit 8 is connected with a conveniently disposed source of water-supply.

A shaft 9 suspended in bearings above the vessel, carries at its lower extremity, series of scraper arms 10 which extend above and in suitable proximity to the bottom 3.

The scraper arms may be of any form adapted to impel the material settling upon the bottom of the vessel, toward the outlet which, preferably, is centrally disposed with relation to the circumferential wall of the vessel.

The shaft which in the operation moves about an axis coincident with that of the container, is slowly rotated by means of a worm movement 12 or other suitable driving mechanism.

A laundry 13 surrounding the upper edge of the container receives the overflow in which the fine material or undersize is suspended, while the settled coarse product or oversize is discharged through the outlet 5 and past the open valve 7.

In the operation of the classifier, pulp is fed into the vessel at a point beneath the liquid level established by the overflow, through a conduit 14 which is vertically adjustably connected with a support 15 extending transversely above the container.

The material fed into the vessel is automatically separated into two sizes by gravitation of its coarser particles which, as mentioned hereinbefore, are discharged through the outlet 5, while the lighter particles which remain in suspension in the liquid, overflow into the laundry 13.

If it is desired to accelerate the separating action by an upwardly flowing counter-current, the valve in the conduit 8 which connects the chamber 6 with a source of water supply, is opened in accordance with the strength and volume of the current it is desired to introduce.

In the construction shown in Fig. 3 of the drawings, the bottom of the container tapers downwardly to the central outlet 5, with the object of accelerating the movement of the settling solids which by the action of the scraper arms are impelled toward the outlet 5.

Having thus described my improved classifier in the best form at present known to me, I desire it understood that variations in the construction and arrangement of its parts, other than those hereinbefore referred to, may be resorted to within the spirit of my invention as defined in the appended claims:

1. A classifier comprising a shallow container, having an overflow for liquid and suspensions and a substantially flat bottom surface provided with an outlet for settling matter, sweeps for moving settled matter across said bottom surface toward said outlet, and means for introducing into the bottom portion of the container an upwardly directed liquid-current sufficient to elevate the finer solids to the overflow.

2. A classifier comprising a shallow container, having an overflow for liquid and suspensions and a substantially flat-bottom surface provided with an outlet for settling matter, sweeps for moving settled matter across said bottom surface toward said outlet, means for introducing an upwardly directed liquid-current into the bottom portion of the container, sufficient to elevate the finer solids to the overflow, and means for feeding material into the container below the liquid-level determined by the overflow.

In testimony whereof I have affixed my signature in presence of two witnesses.

ALFRED L. BLOMFIELD.

Witnesses:
G. J. ROLLANDET,
L. RHOADES.